United States Patent
Shah et al.

(10) Patent No.: US 7,899,591 B2
(45) Date of Patent: Mar. 1, 2011

(54) PREDICTIVE MONITORING FOR VEHICLE EFFICIENCY AND MAINTENANCE

(75) Inventors: Baiju Shah, Chicago, IL (US); James Richmond, Chicago, IL (US); Mikhail Shemyakin, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 1235 days.

(21) Appl. No.: 11/486,476

(22) Filed: Jul. 13, 2006

(65) Prior Publication Data
US 2007/0027593 A1    Feb. 1, 2007

Related U.S. Application Data

(60) Provisional application No. 60/699,585, filed on Jul. 14, 2005.

(51) Int. Cl.
*G06F 7/00* (2006.01)
(52) U.S. Cl. ........................... 701/30; 123/406.13
(58) Field of Classification Search ............... 701/30, 701/36, 104, 29; 123/406.03, 525, 406.13; 60/780, 793; 702/33, 50, 55, 81; 180/54.1, 60, 65.1, 69.5, 301
See application file for complete search history.

(56) References Cited

U.S. PATENT DOCUMENTS

| 6,144,910 | A  | * | 11/2000 | Scarlett et al. ................... 701/50 |
| 6,853,930 | B2 | * | 2/2005  | Hayashi et al. .................. 702/61 |
| 7,164,975 | B2 | * | 1/2007  | Bidaud ........................... 701/19 |
| 2004/0078171 | A1 | | 4/2004 | Wegerich et al. |
| 2005/0004821 | A1 | | 1/2005 | Garrow et al. |

* cited by examiner

*Primary Examiner* — Dalena Tran

(57) ABSTRACT

A system and method for monitoring fuel efficiency of a vehicle is provided. Fuel efficiency of a vehicle may be monitored in real-time using telemetry transmitted from the vehicle. The telemetry may be analyzed in combination with a fuel efficiency model in order to determine whether the real-time fuel efficiency determination deviates from a baseline fuel efficiency. The real-time fuel efficiency monitoring system and method may be used for feedback for the driver, such as sending real-time messages to the driver to modify operation of the vehicle to increase fuel efficiency. The fuel efficiency model may further be used to assign vehicles in a fleet to particular routes, vehicles to particular drivers, or vehicles to particular routes with particular drivers.

14 Claims, 5 Drawing Sheets

PREDICTIVE MONITORING FOR VEHICLE EFFICIENCY AND MAINTENANCE

CROSS REFERENCE TO RELATED APPLICATION

This application claims the benefit of U.S. Provisional Application No. 60/699,585, filed Jul. 14, 2005. The entirety of U.S. Provisional Application No. 60/699,585 is hereby incorporated by reference.

BACKGROUND OF THE INVENTION

1. Technical Field

The invention relates to systems for monitoring efficiency and predicting failures for mechanical devices, such as vehicles. In particular, the invention relates to systems capable of real-time monitoring of fuel efficiency and predictive maintenance for vehicles.

2. Related Art

Demand for energy, such as oil, gas, electricity, is at an all-time high and is predicted to increase for the foreseeable future. This increasing demand is in contrast to the resources for energy that remain essentially static. Because of this, energy prices will likely continue to rise.

Faced with these rising energy costs, many companies have attempted to reduce energy consumption for their vehicles. One way is for the company to collect and analyze past energy usage for the vehicles. For example, the amount of fuel used and the number of miles driven over one or more months are typically collected. The collected energy data is then analyzed in order to determine the fuel efficiency of the vehicles, and to compare the determined fuel efficiency with an expected fuel efficiency. If the determined fuel efficiency is lower that expected, this may indicate a problem in the vehicle, such as requiring maintenance of the vehicle. The vehicle may then be serviced in order to correct for the lower than expected fuel efficiency.

While this method may improve fuel efficiency of vehicles, given the increasing cost of energy, there is a need to further improve fuel efficiency of vehicles.

SUMMARY

In one embodiment, a real-time energy efficiency determination system and method are provided. Energy efficiency may relate to conserving any type of energy (such as gasoline, electricity, or the like) for any type of mechanical device, such as a vehicle (e.g., bus, car, train, airplane, boat), or a manufacturing machine (e.g., an assembly machine, robot, or the like). One or more operational characteristics of the mechanical device, such as the vehicle's average fuel economy, may be transmitted to a central system. The central system may analyze the transmitted operational characteristic along with an efficiency model that may include an optimum fuel efficiency for the vehicle. For example, the central system may analyze average fuel efficiency variance by subtracting an average fuel efficiency transmitted from the vehicle from the optimum fuel efficiency in the efficiency model. The central system may then assess whether to modify operation of the vehicle to improve fuel efficiency (such as whether to repair the vehicle to improve fuel efficiency).

The efficiency determination system may work in combination with a failure prediction system. The failure prediction system may use an operational model to predict future operation of the vehicle, such as whether there may be an equipment failure in the vehicle. The central system may assess the impact of the predicted failure and the impact of the potential remedies to determine whether to repair the vehicle.

In another embodiment, a real-time energy efficiency determination system and method are provided for feedback of the operation of a vehicle. Operational data may be sent via telemetry to the central station. The central system may analyze the transmitted operational characteristic along with an efficiency model to analyze the operation of the vehicle in real-time. The efficiency model may include optimum operating conditions for fuel efficiency for the vehicle (e.g., rate of acceleration, rate of breaking, speed fluctuation, and speed during cornering). The central system may then assess a driver of the vehicle based on the real-time operational characteristics of the vehicle and the vehicle efficiency model, and generate a recommendation as to the assessment of the driver of the vehicle (such as transmitting to the driver in real time a recommendation to modify driving to improve fuel efficiency, or such as generating a report regarding the assessment of the driver of the vehicle).

In still another embodiment, a vehicle allocation system and method is provided. Each vehicle in a fleet may be modeled for fuel efficiency for one or more routes (or one or more characteristics of routes), and/or one or more drivers. The central system may access the model for each vehicle in order to assign a particular vehicle to a particular route, assign a particular driver to driver a particular vehicle, and/or assign a particular driver to drive a particular route using a particular vehicle. This driver and/or route optimization process may be in communication with the enterprise scheduling systems to check for availability and automatically assign drivers and vehicles to the appropriate routes. In this manner, the central system may improve overall fleet efficiency by creating vehicle-route, vehicle-driver, or vehicle-route-driver match-ups that provide the optimal result.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
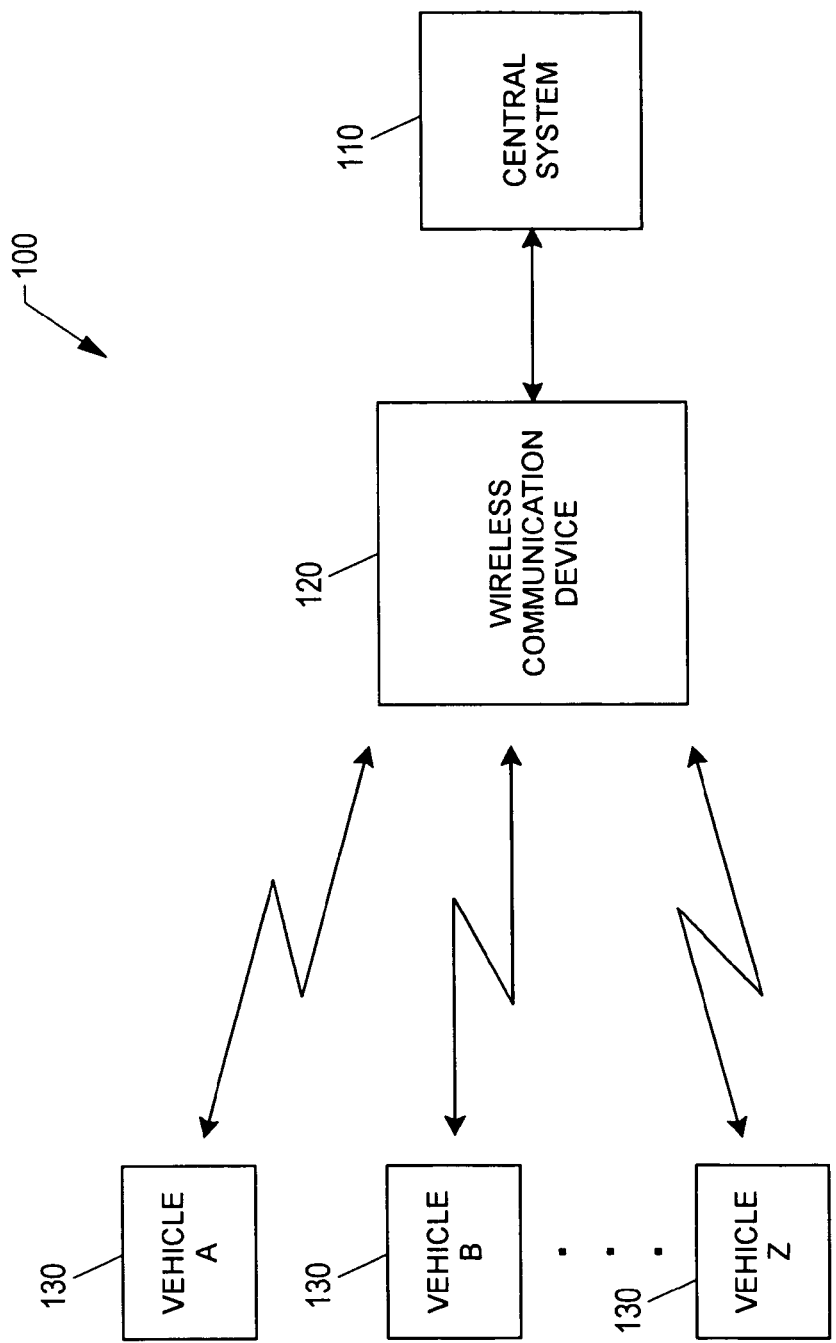
FIG. 1 is a block diagram of one configuration of the invention of the fuel efficiency system including vehicles, a wireless communication device and a central system.

Public or private organizations typically have assets used to operate the organizations. The assets may include one or more types of mechanical equipment, such as a vehicle (e.g., car, bus, train, airplane, or the like) or a manufacturing machine (e.g., an assembly machine, robot, or the like). These assets typically operate using one or more types of energy. For example, a vehicle may operate using gasoline, diesel fuel, etc. The organization may wish to reduce the amount of energy used to operate the mechanical equipment, such as reduce the amount of gasoline or diesel fuel used to operate an organization's fleet of vehicles.

One manner in which to reduce the amount of energy used is to model the organization's mechanical equipment. For example, each vehicle within an organization's fleet may be modeled. And, any aspect of the vehicles within an organization may be modeled. As discussed in more detail below, the model may comprise subparts that relate to different aspects of the vehicle. One part of the model may comprise an optimum fuel efficiency for the vehicle. Another part of the model may comprise optimum operating conditions for the vehicle (e.g., rate of acceleration, rate of breaking, speed fluctuation, and speed during cornering). The model, in combination with real-time data generated from the vehicle, may be used: (1) to determine real-time fuel efficiency of the vehicle; (2) to determine whether to modify operation of the vehicle to improve fuel efficiency (such as whether to repair the vehicle to improve fuel efficiency); (3) to predict future operation of the vehicle (such as whether there may be an equipment failure in the vehicle); (4) to analyze the driving patterns of the driver (and potentially provide feedback to the driver); (5) to determine how to allocate vehicles in a fleet (e.g., a vehicle fuel efficiency model that models the fuel efficiency based on one of the following variables, driver, route, characteristics of the road, weather, condition of road, time of day, etc. may be used to determine which vehicle should be assigned to which driver, which route, which weather, which road, which time of day, etc.); and (6) to analyze routes and efficiency to determine which routes lead to lower efficiency and why, and to recommend solutions to correct for lower efficiency of certain routes.

The models for the vehicles may be used in combination with data generated onboard the vehicle, passive data synchronization (i.e., transmission of the data from the vehicle to a central system without the interaction of the operator of the vehicle), and automated provision of warnings of decreased energy efficiency. More or fewer components may be used. Real-time data may be generated on the vehicle of various aspects of the current state of the vehicle (such as data indicative of current fuel efficiency, current operation, current position, etc.). Further, the real-time data may be generated at any interval, such as at continuous intervals in an "always-on" manner. The real-time data may be transmitted to the central system in the form of telemetry data feeds. The central system may analyze the real-time data in combination with the model, and determine the state of the vehicle (such as determine current real-time energy efficiency operation and/or predict future operation of the vehicle, such as a breakdown in the vehicle). Maintenance organizations may then use these efficiency predictions to prioritize and optimize provision of preventative maintenance.

Thus, the central system may analyze one or both of: (1) the real-time efficiency of the vehicle; and (2) predict conditions that may affect the efficiency of the vehicle and prevent the conditions from occurring before excess fuel or energy is consumed. The analysis of the central system is different from previous energy analysis systems in several respects. First, the real-time analysis is different from previous passive, after-the-fact analysis performed on historical data at monthly intervals. Second, the use of the model is prospective, looking to the future of the operation of the vehicle. This is in contrast to previous efficiency systems that are retrospective, reacting to low efficiency of the vehicle after the fact.

Turning to the drawings, FIG. 1 shows a block diagram of one configuration of the fuel efficiency system 100. The fuel efficiency system 100 may include a central system 110 that communicates with one or more vehicles (vehicle A 130, vehicle B 130, . . . vehicle Z 130) wirelessly through wireless communication device 120. The wireless communication may be one or more of the following: satellite, cellular, or private radio frequency (RF). Other types of wireless communication may be used. Though FIG. 1 depicts a wireless system, communication between the monitored mechanical equipment may be wired, or a combination of wired and wireless. For example, if the mechanical equipment to be monitored is a machine on a manufacturing assembly line, the communication to the central system 110 may be wired, obviating the need for wireless communication device 120. Moreover, the vehicle may include one or more sensors, as discussed in more detail below, that generate data indicative of the current state of the vehicle (such as current mechanical or electrical operation, current position, etc.).

Figure 2:
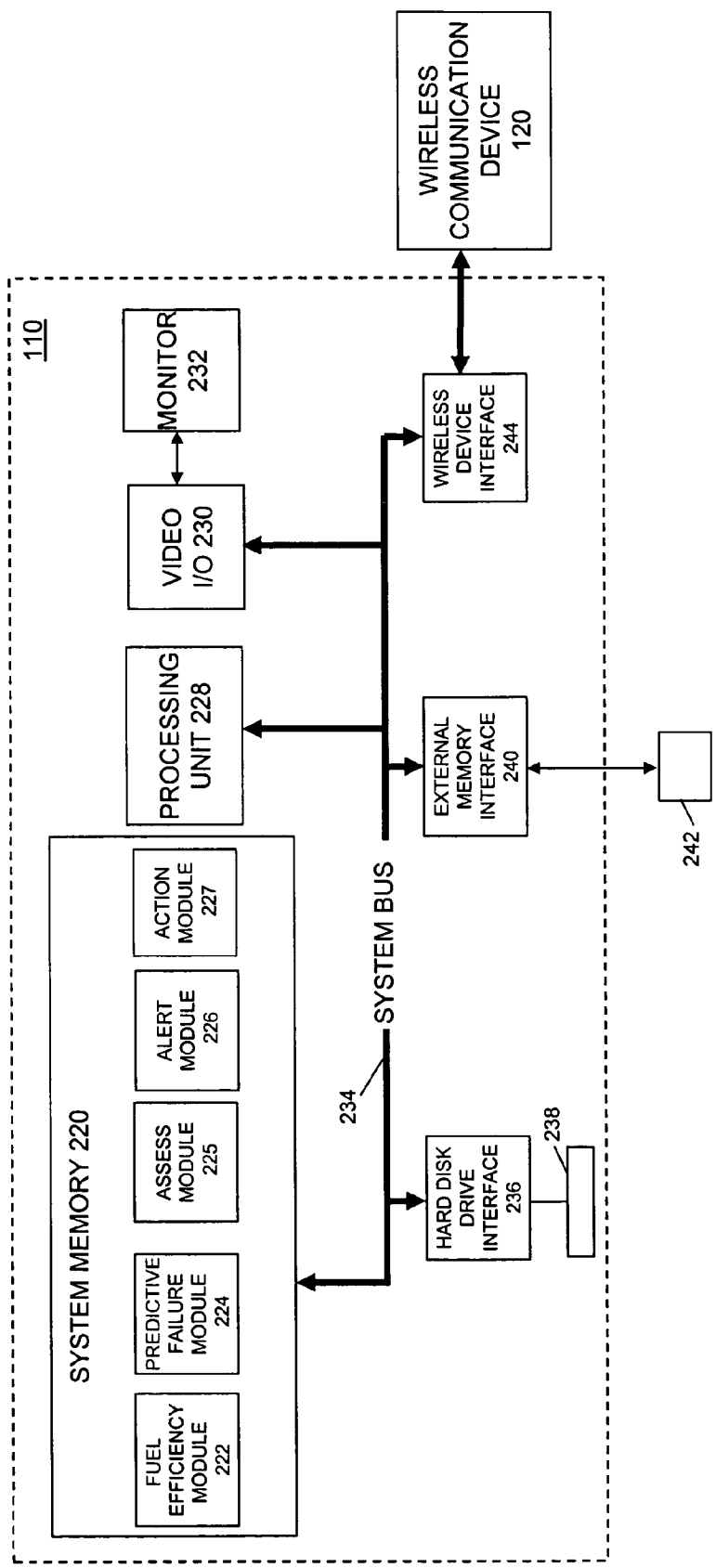
FIG. 2 is an expanded block diagram of the central system shown in FIG. 1.

FIG. 2 illustrates an expanded block diagram of the central system 110 depicted in FIG. 1. Central system 110 may comprise a general purpose computing device, including a processing unit 228, a system memory 220, and a system bus 234, that couples various system components including the system memory 220 to the processing unit 228. The processing unit 228 may perform arithmetic, logic and/or control operations by accessing system memory 220. The system memory 220 may store information and/or instructions for use in combination with processing unit 228. The system memory 220 may include volatile and non-volatile memory, such as random access memory (RAM) and read only memory (ROM). RAM may include computer-readable programming corresponding to the flow charts in FIGS. 3-5 and may include one or more software programs, such as fuel efficiency module 222 (which may access the fuel efficiency model), predictive failure module 224 (which may access the operational model), assess module 225, alert module 226, and action module 227. The system bus 234 may be any of several types of bus structures including a memory bus or memory controller, a peripheral bus, and a local bus using any of a variety of bus architectures.

Central system 110 may receive input from the vehicles 130 via wireless communication interface 120. Central system 110 may further include a data storage interface 236 for reading from and writing to a data storage device 238, and an external memory interface 240 for reading from or writing to an external database 242. The data storage device 238 may include a hard disk, flash-type memory, or other non-volatile memory. The external database 242 may store the models for the vehicles. Although the exemplary environment described herein employs a hard disk 238 and an external database 242, other types of computer readable media which can store data that is accessible by a computer, such as magnetic cassettes, flash memory cards, random access memories, read only memories, and the like, may also be used in the exemplary operating environment. Though FIG. 2 depicts system memory 220 as storing fuel efficiency module 222, predictive failure module 224, assess module 225, alert module 226, and action module 227, any one of, any combination of, or all of the hard disk 238, external database 242, or system memory 222 may store the modules.

Figure 3:
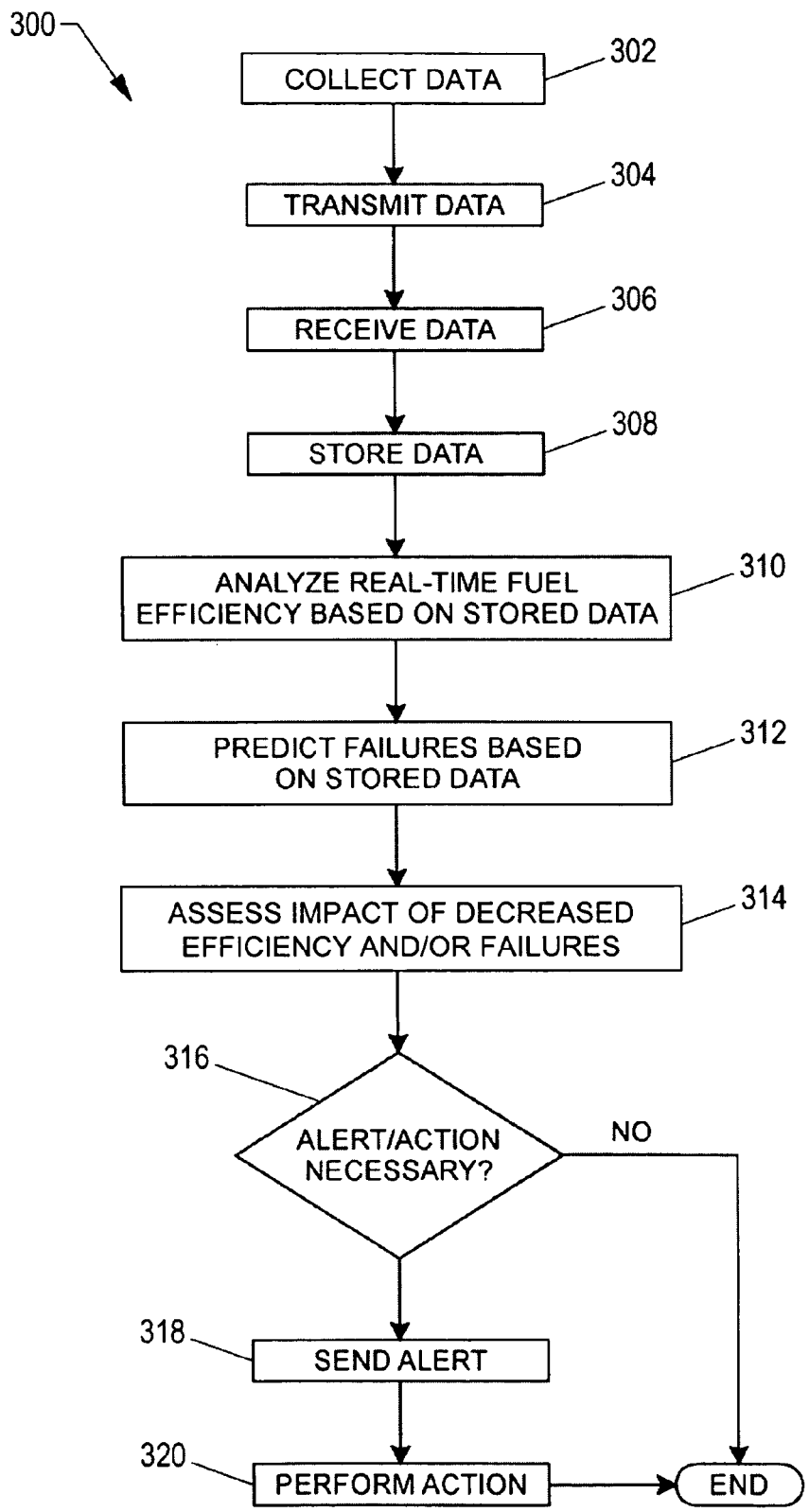
FIG. 3 is one example of a flow chart of operation of the fuel efficiency system.

The fuel efficiency system 100 may operate in various ways. One example is a seven-step process that includes: (1) collecting data; (2) transmitting the data; (3) receiving (and optionally validating the data); (4) storing (and optionally processing and cleaning) the data; (5) analyzing and/or predicting; (6) assessing and alerting; and (7) taking action. More or fewer steps may be performed. FIG. 3 illustrates one example of a flow chart 300 of the various steps listed above. As shown at block 302, the data is collected. For example, various sensors may be used on a vehicle to collect data regarding characteristics of the vehicle. As shown at block 304, the data may be transmitted to the central system. Data may be transmitted in real-time, such as approximately when the data is generated. Or the data may be transmitted in batches, with the data being stored for a predetermined amount of time in the vehicle prior to transmission. As shown at block 306, the data may be received. In addition to receiving the data, the data may also be validated. Validation may comprise analysis of the data to determine whether the data should be processed or should be rejected due to errors, such as sensor malfunctions or errors in transmission. As shown at block 308, the data is stored. In addition, the stored data may optionally be processed and cleaned.

The data may be analyzed in order to determine the real-time fuel efficiency of the vehicle, as shown at block 310. For example, the fuel efficiency module 222 may perform a statistical analysis in real-time using the fuel efficiency model to determine the presence of any significant fluctuations. Further, the statistical analysis may be performed continuously in an "always on" manner. In one embodiment, every piece of telemetry received from the vehicle may be collected and statistically analyzed, rather than solely sampling efficiency at intervals. As discussed in more detail below, the analysis may include efficiency regarding road miles covered throughout a duty cycle per unit of fuel consumed. The efficiency may be compared with a part or all of the fuel efficiency model of the vehicle, such as a baseline fuel efficiency. For example, an ongoing measurement of current efficiency may be compared to the baseline efficiency in the model, and degraded performance may be detected.

The data may also be used to predict failures in the vehicle, as shown at block 312. For example, the predict failure module 224 may compare the data with the operational model for the vehicle to predict potential failures. An assessment is made of the impact of the real-time fuel efficiency and/or the predicted failures, as shown at block 314. Based on the assessment, a determination is made (block 316) whether to send an alert (block 318) and/or perform an action (block 320).

The fuel efficiency model may provide one or more outputs. One example of an output of the fuel efficiency model may comprise the optimum fuel efficiency of the vehicle (such as the optimum fuel rate). Another example of an output may comprise the conditions that may support optimum fuel efficiency. For example, the rate of acceleration, rate of braking, speed fluctuation, speed during cornering, etc. may comprise conditions that support optimum fuel efficiency. These conditions are provided merely for illustrative purposes. Other conditions may be used.

The fuel efficiency model may include zero, one, or more inputs depending on the complexity of the model. For example, at its simplest, the fuel efficiency model may include no inputs, merely requesting the optimum fuel efficiency of the vehicle. Specifically, at its simplest, the fuel efficiency model may comprise a baseline or optimum fuel efficiency for the vehicle (such as a single number that indicates the fuel volume consumed per unit of distance traveled (e.g., miles per gallon)). At its more complex, the fuel efficiency model may depend on certain variables and input one or more variables, such as: (1) the characteristics of the road (e.g., type of road (e.g., highway versus city), altitude changes (e.g., number of hills); speed limits; condition of road (poor or good)); (2) weather (rain, snow, sunny); and (3) operational characteristics of the vehicle (e.g., load of vehicle (e.g., fully loaded with passengers), certain mechanical systems operating (air-conditioning operating or not operating)). Thus, the fuel efficiency model at its more complex may have one or more optimum fuel efficiencies or optimum conditions depending on the variable or variables input to the model (e.g., one optimum fuel efficiency for highway operation with the air conditioning not operating, and another optimum fuel efficiency for city operation with the air conditioning operating; or one optimum rate of acceleration during rain and another optimum rate of acceleration during snow). At its even more complex, the fuel efficiency model may include additional variables tailored to the specific application of the vehicle, such as specific driver operating vehicle (e.g., running average or optimum fuel efficiency for different drivers that operate the vehicle), specific route (e.g., #157 bus route versus #151 bus route). Again, the fuel efficiency model at its more complex may have one or more optimum fuel efficiencies or optimum conditions depending on the variable or variables input to the model (e.g., one fuel efficiency for driver #1 driving #157 bus route, and another fuel efficiency for driver #2 driving #151 bus route). These input variables for the fuel efficiency model are provided merely for illustrative purposes. Other variables may be used.

The fuel efficiency model may be generated in a variety of ways, such as by performing an initial empirical study of fuel added and road miles completed before exhaustion, or from a passive study of existing data. The empirical study or passive study may be performed on the specific vehicle for which the model is created or for a vehicle with the same make, model, options, etc. The fuel efficiency model may also be generated by obtaining telemetry data (such as data for specific drivers on specific routes)

The fuel efficiency model may be used to determine fuel efficiency of the vehicle in real-time. As discussed in block 310 above, a vehicle's fuel efficiency (e.g., amount of gasoline used) may be analyzed. The fuel efficiency of the vehicle may be analyzed in a variety of ways, and may depend on the vehicles and engines varying levels of sophistication and varying amounts of operational data reported. For example, as discussed below, there may be three different types of fuel efficiency analysis including: (1) Average Fuel Efficiency Variance Analysis; (2) Implied Average Fuel Efficiency Variance Analysis; and (3) Extrapolated Average Fuel Efficiency Variance Analysis. Other types of statistical analysis may be performed. Further, these analyses may vary for different engine types (e.g. diesel, compressed natural gas, hybrid, etc.).

For other mechanical devices, such as an assembly machine, robot, etc. the amount of electricity or other type of energy may be analyzed. Prior to the real-time statistical analysis of the energy efficiency of the mechanical device, the fuel efficiency model may be generated.

Figure 4:
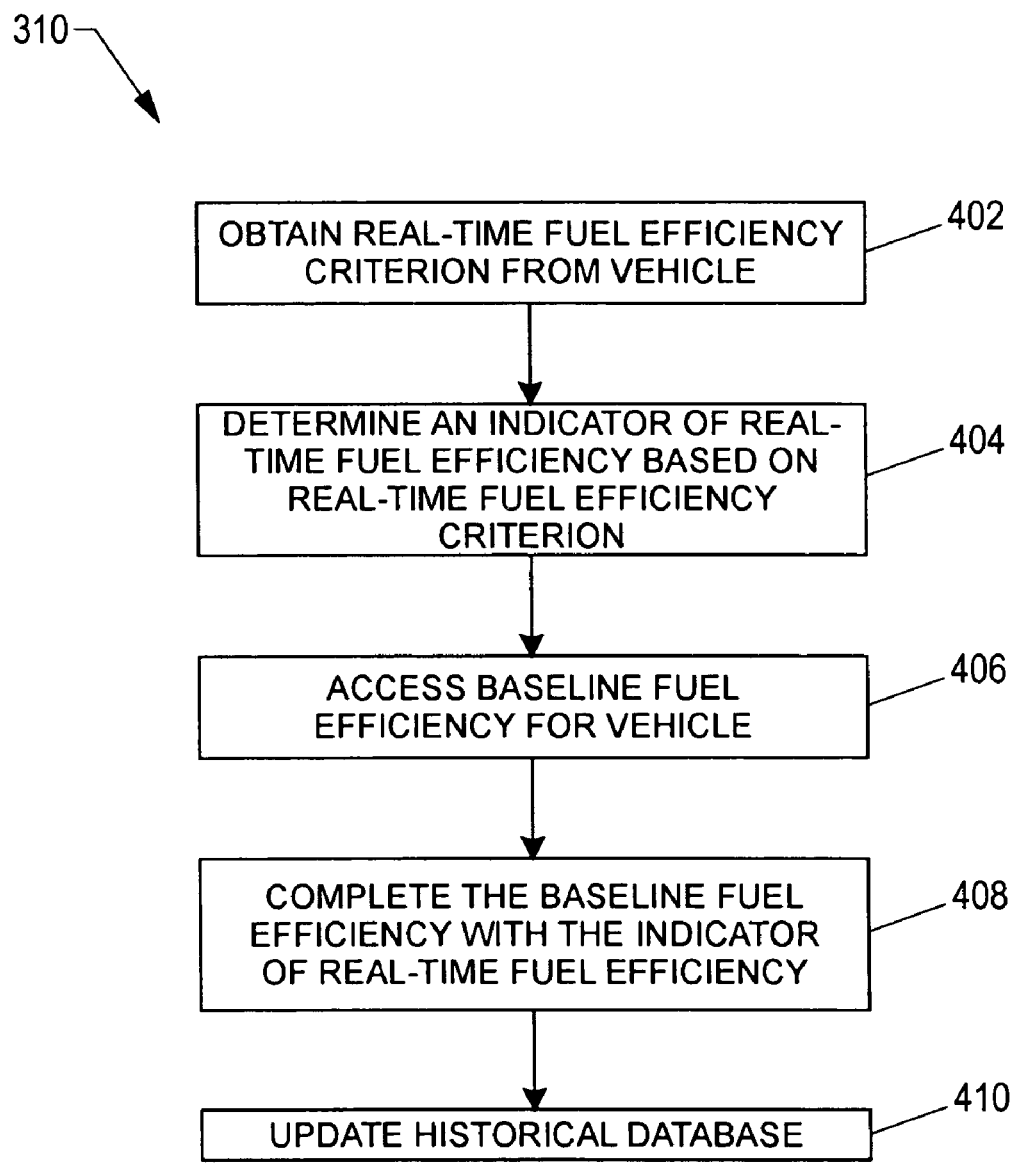
FIG. 4 is an example of a flow chart for analyzing the real-time fuel efficiency of the vehicle.

Referring to FIG. 4, there is shown a flow chart of block 310 depicted in FIG. 3. As shown at block 402, a real-time fuel efficiency criterion may be obtained from the vehicle. The real-time fuel efficiency criterion may be one of several indicators of the vehicle's fuel economy, as discussed below. An indicator of the real-time fuel efficiency may be determined based on the real-time fuel efficiency criterion, as shown at block 404. For example, the real-time fuel-efficiency of the vehicle may be determined by only examining the real-time fuel efficiency criterion (e.g., current fuel consumption of the vehicle, current fuel rate, etc.). Or, the fuel efficiency of the vehicle may be based on a combination, such as an average, of the real-time fuel efficiency criterion and previous determinations of fuel efficiency. Averaging may increase the reliability of the determined fuel efficiency. After the indicator of the real-time fuel efficiency is determined, the baseline fuel efficiency is accessed (block 406) and the two are compared (block 408). As discussed below, the comparison may be performed in a variety of ways, such as by generating an average fuel efficiency variance analysis, implied average fuel efficiency variance analysis, and extrapolated average fuel efficiency variance analysis. The comparison may be analyzed in the assess module 225, alert module 226, and/or the action module 227. Further, the historical database (such as database 242) is updated with the data, as shown at block 412.

One example of a statistical analysis of a fuel efficiency criterion is the vehicle's average fuel economy. The vehicle itself may calculate its average fuel economy over a preconfigured distance. Several automotive standards specify certain values to generate in controlling a vehicle. One standard is the Society of Automotive Engineers (SAE) J1708 standard for vehicle communications, which specifies that in the stream of values, PID 185 represents the vehicle's average fuel economy. As discussed above at block 404, an indicator of real-time fuel efficiency is determined based on the real-time fuel efficiency criterion. This step may not be necessary, such as in the case where the vehicle transmits its average fuel efficiency. Thus, this value may be used as transmitted, or may be combined with previous reading's of average fuel efficiency, such as further averaged over a vehicle's duty cycle to increase reliability (e.g., over a 7 day period for a city bus to ensure that all passenger load configurations are included in the sample). The fuel efficiency (either the transmitted or average fuel efficiency) may be subtracted from the baseline fuel efficiency to yield the variance in fuel efficiency over time. The time period may be a configurable interval. For example, the time period may be since the last time the operation was performed. This value of the average fuel efficiency variance may be output to the assess module 225, alert module 226, and/or the action module 227.

Another example of a statistical analysis of a fuel efficiency criterion is the vehicle's total fuel consumed. In the SAE J1708 standard, PID 250 represents the vehicle's total fuel consumed. Subtracting this value from the previous value retrieved yields the fuel consumption during a predetermined period. This value may be used as-is or may be further averaged over a vehicle's duty cycle to increase reliability (e.g., over a 7 day period for a city bus to ensure that all passenger load configurations are included in the sample). The actual road miles traveled by the vehicle may be determined from values received from a Global Positioning System (GPS) receiver on the vehicle. Dividing the actual road miles by the per unit fuel consumption determined above yields an objective real-time measure of fuel efficiency. Subtracting the real-time fuel efficiency determined from the baseline fuel efficiency yields the variance in fuel efficiency over time (e.g., the time period being since the last time the operation was performed, which is a configurable interval in the system). This value of the implied average fuel efficiency variance may be output to the assess module 225, the alert module 226, and/or the action module 227.

Still another example of a statistical analysis of a fuel efficiency criterion is the vehicle's fuel rate. In the SAE J1708 standard, PID 183 represents the vehicle's fuel rate. Averaging this value over time yields the long term fuel rate consumption. This value may be used as-is or may be further averaged over a vehicle's duty cycle to increase reliability (e.g., over a 7 day period for a city bus to ensure that all passenger load configurations are included in the sample). Multiplying the value by the time interval of data collection yields the fuel consumption (e.g., fuel rate of 0.5 liters per minute times 20 minutes gives us 10 liters of fuel consumed). Previous steps of data acquisition deliver a stream of values of the actual road miles traveled by the vehicle. Dividing this data by the per unit fuel consumption yields an objective measure of fuel efficiency. Subtracting the fuel efficiency from the baseline fuel efficiency yields the variance in fuel efficiency over time (e.g., the time period being since the last time the operation was performed, which is a configurable interval in the system). This value of the extrapolated average fuel efficiency variance may be output to the assess module 225, the alert module 226, and/or the action module 227.

Figure 5:
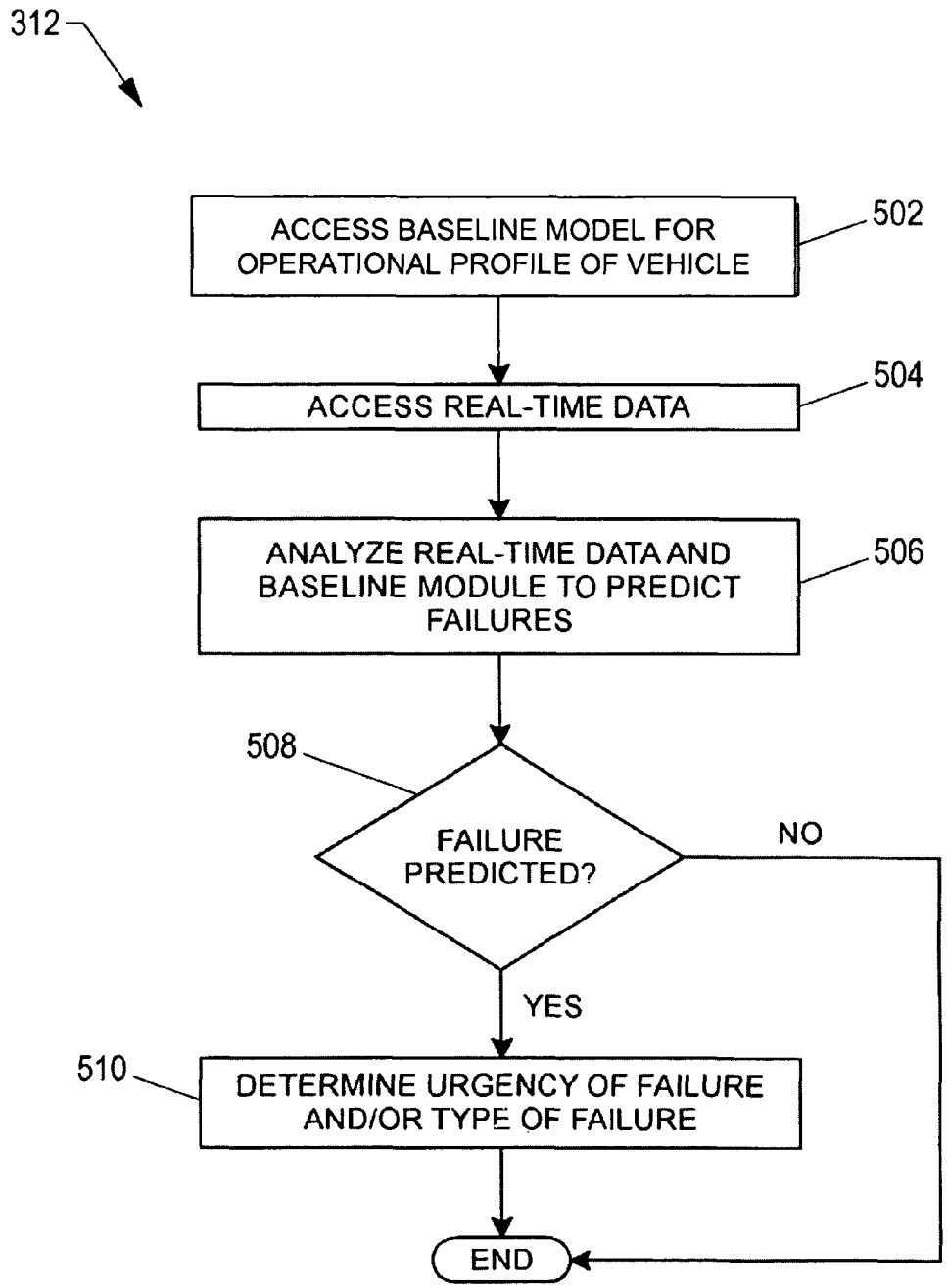
FIG. 5 is an example of a flow chart for predicting failures of the vehicle.

Predicting failures, discussed above in block 312, may determine if there are any equipment failures in early stages in the asset, and if so, how and when the failures will occur. In the example of vehicles, equipment failures may include items like piston cracks, fouled turbochargers, oil leakage, etc. These examples of equipment failures are provided for illustrative purposes. Other failures may be predicted as well. One example of a system for predicting failures is by SmartSignal Corporation of Lisle, Ill. SmartSignal Corporation offers EPI*Center software solution that continuously inspects equipment performance to identify performance failures before they happen. As a result, corrective action may be taken at the lowest cost and with the least disruption to operations. An example of a patent application by SmartSignal Corporation is entitled "Diagnostic Systems and Methods for Predictive Condition Monitoring," U.S. application Ser. No. 10/681,888, filed on Oct. 9, 2003, Publication No. 2004/0078171 A1. U.S. application Ser. No. 10/681,888, filed on Oct. 9, 2003, Publication No. 2004/0078171 A1 is incorporated by reference herein. The fuel efficiency statistical analysis discussed in regard to block 310 may be performed in conjunction with the predictive failure analysis discussed in block 312. FIG. 5 illustrates a flow chart of block 312 depicted in FIG. 3.

As shown at block 502, the baseline model for the operational model of the vehicle is accessed. The operational model may be aggregated over time from data delivered to the central system 110 via the wireless communication described above, or gathered through other means. It may include a period of continuous operational data of the vehicle, such as two weeks of data, for various data points of the vehicle. The following is an exemplary list of sixteen data points: (1) Road speed; (2) Engine speed; (3) Engine load; (4) Fuel rate; (5) Accelerator pedal position; (6) Coolant temperature; (7) Instantaneous fuel economy; (8) Boost pressure; (9) Oil pressure; (10) Manifold pressure; (11) Oil Temperature; (12) Fuel Consumption; (13) Transmission oil temperature; (14) Transmission range selected; (15) Transmission range attained; and (16) Hydraulic retarder oil temperature. Fewer, greater, or different data points may be used to generate the operational model.

The predict failure module may access the data points (block 504). The operational model may be divided into two or more sub-models comprising a primary (engine) model and an auxiliary (transmission and cooling) model. A continuous data feed may be established to the operational model from the vehicle. For example, data may flow from the sixteen dimensions outlined above plus any additional sensor feeds to the operational model by way of a flat file export from a database (e.g., Microsoft's SQL Server DTS functionality) into a directory that is regularly polled.

The predict failure module 224 may use the operational model to analyze the data points to predict failures, as shown at block 506. Specifically, the predict failure module 224 may perform a complex series of vector ordering calculations on the input data and generate a set of residuals for each sensor, such as a measure of the variance between the expected sensor value given all other sensor values and the actual sensor value from the data stream. If the residual is greater than a preset threshold (that may be determined when the operational model is created), an alert is generated (block 508).

When alerts are generated, both the urgency of the event and the type of impending failure may be estimated by the operational model, as shown at block 510. The urgency may be determined by the number of alerts generated in a period of time and the relative size of the residual. The type of failure may be extrapolated from the particular sensor (or combination of sensors) which are deviating from the expected (e.g. positive residuals on engine oil temperature and coolant temperature and a negative residual on coolant pressure would indicate a bad coolant pump). These two data points, predicted failure description and urgency factor, may be output from the predict failure module 224.

The outputs of block 310 (assessing fuel efficiency) and block 312 (predicting failures) may be input to block 314 (assessing impact of decrease efficiency and/or failures). The assess module 225 may focus on determining the impact of failures and decreased efficiency on operations from a holistic standpoint and the cost impacts of some possible responses. For example, some failures or degraded efficiency may have direct costs associated with them, while others may incur latent fees that require additional calculations. Further, in some cases, the maintenance to be performed may be more costly than the breakdown. As discussed in more detail below, this may be considered in assessing the impact of the failure or decreased efficiency. The assessing process may additionally search for reasons for degraded efficiency unrelated to the mechanical condition of the vehicle, such as driver behavior and route selection.

The degraded fuel efficiency may be analyzed by the assess module 225 in several ways. For example, the impact(s) of degraded efficiency and its potential remedies (such as repairing the vehicle) may be calculated in three steps. When the fuel efficiency module 222 detects degraded efficiency, the amount of the degradation may be sent to the assess module 225. The assess module may multiply the increased fuel consumption by the amount of time until the next scheduled maintenance procedure (that would presumably alleviate the efficiency problem). Multiplying by the expected future cost of fuel yields the expected incremental cost of the inefficiency.

The cost of early corrective maintenance may be calculated in a holistic manner, such as by adding together one, some, or all of the following costs: (1) opportunity cost of removing the unit from service for maintenance (including lost fees or cartage revenue); (2) labor cost of servicing the unit outside its existing schedule (labor cost may involve technician overtime); (3) parts purchases if necessary; and (4) use of spare units during the maintenance to maintain service levels (and their associated depreciation, etc.). The costs are merely for illustrative purposes. Other costs may be analyzed.

The cost impact of running at a decreased level of efficiency determined above and the cost impact of performing maintenance to correct the decreased inefficiency may be compared, and the lesser of the two may be determined to be preferable. This problem, suggested resolution, and financial impacts may then be passed to the alert module 226.

Another example of the assess module 225 analyzing the degraded fuel efficiency may focus on non-mechanical (e.g., non-repair) causes. Specifically, the causes, impacts and potential remedies for non-mechanical efficiency degradation may be analyzed. First, a data source containing driver, vehicle and route information for each trip may be merged with the real-time efficiency data from the fuel efficiency module. As discussed above, the fuel efficiency model for a vehicle may include a variable based on the driver and route information. The real-time efficiency data may be used to generate that portion of the model. Second, driving patterns may be correlated to real-time efficiency in order to determine driving patterns that are conducive to optimal efficiency. As discussed above, the fuel efficiency model may include optimal conditions. The conditions of driving patterns in question may include, but are not limited to: (1) rate of acceleration; (2) rate of breaking; (3) speed fluctuation; and (4) speed during cornering.

Third, correlation analysis may be performed between routes and efficiency to determine which routes lead to lower efficiency and why. The assessment may be taken extended by utilizing the geographical (for example from GPS) and route data to perform correlation analysis of efficiency versus route parameters such as, but not limited to: (1) altitude changes (e.g., hills); (2) number and angle of turns; (3) number and frequency of stops; (4) speed limit along the route segments; and (5) road type (highway versus city street versus rural road). The assessment may then be used to propose modified routes, or modified driving along existing routes in order to increase fuel efficiency.

The assess module 225 may also assess the impact(s) of predicted failure and its potential remedies. This may be performed in four steps. First, when the predict failures module 224 predicts an equipment failure, that prediction and the subsystem(s) affected may be sent to the assess module 225. The assess module may first examine the subsystem(s) affected and make a determination of urgency based on whether or not system safety is impacted (e.g., if vehicle braking is in danger of being compromised).

Second, the cost of the outage, such as of letting the unit fail, may be calculated in a holistic manner, adding together one, some, or all of the following costs: (1) opportunity cost of removing the unit from service for maintenance (including lost fees or cartage revenue); (2) any penalties associated with removing the unit from service unscheduled (e.g., violations of service level agreements); (3) charges associated with expedited parts purchases if necessary; (4) use or rental of spare units during the maintenance to maintain service levels (and their associated depreciation, etc.); (5) on-site towing, maintenance and support personnel, municipal fees, and associated overtime if applicable; (6) replacement of spoiled cargo; and (7) impact of cascade failures in which one failure causes others (e.g. diesel turbocharger blades being thrown into intake valves).

Third, the cost of early corrective maintenance may also be calculated in a holistic manner, adding together one, some, or all of the following costs: (1) opportunity cost of removing the unit from service for maintenance (including lost fees or cartage revenue); (2) labor cost of servicing the unit outside its existing schedule (labor cost may involve technician overtime); (3) parts purchases if necessary; and (4) use of spare units during the maintenance to maintain service levels (and their associated depreciation, etc.). The costs are merely for illustrative purposes. Other costs may be analyzed.

Fourth, the cost impact of the outage determined above and the cost impact of performing maintenance to prevent the outage determined above may be compared, and the lesser of the two may be determined to be preferable. The problem, suggested resolution, related financial impacts, and the urgency assessment may be passed to the alert module 226.

The alert module 226 may inform the appropriate people within the organization of maintenance or efficiency problems, and the potential options for resolution. The alert module 226 may provide alerts for the purpose of affecting future behavior. For example, the alerting process may include providing reports detailing and ranking driving behavior of each driver, including developmental points for each. As another example, the alerting process may report similar ratings for routes, to help the appropriate people better understand which routes are causing the overall efficiency to decrease, and what attributes (such as altitude change, number and angle of turns, number and frequency of stops, speed limit along route segments, and road type) of these routes may be causing the decrease. A variety of factors are considered in the process in order to ensure an appropriate response is coordinated as expediently as is appropriate. The alert module 226 may provide alerts for the purpose of affecting current or real-time behavior. For example, the alert module 226 may provide real-time feedback to drivers to modify their behavior in a way that would have a positive effect on efficiency. As discussed below, driver alerts may be issued on an output device (such as a screen and/or a speaker) in the vehicle in real-time.

In the context of a maintenance event (such as either decreased efficiency or a predicted failure), suggested resolution, financial impact, and urgency factor may be received from the assess module 225. A series of logic steps and lookups may be performed to determine which personnel to alert and through which channel.

The process may comprise four steps; however, fewer or greater steps may be used. First, a determination may be made whom to alert. This decision may be based on a holistic assessment of a variety of factors to make sure an organizationally expedient route is taken to problem resolution. If the urgency indicator specifies that there may be a safety issue engendered in a failure, operations supervisors along with regulatory bodies (e.g., OSHA, labor union wardens, etc.) may be involved. If safety is not threatened, lower level technicians may be more appropriate. The type of maintenance required may be a concern as many operations departments are divided into functional areas (more so in unionized environments). Finally, the overall cost of the outage and response may be considered, and supervisors or department heads may be involved if a predetermined dollar threshold is exceeded.

Second, a determination may be made how to alert the appropriate parties. This decision may be based on the urgency of the alert (e.g., page or telephone for higher priorities, email for lower), as well as the preferences of the parties involved. Third, the alert may be transmitted. Fourth, any actions taken by the parties alerted (e.g., acknowledgement and dismissal, forward to another party, or maintenance performed) may be logged, stored, and attributed in the system to the user involved. A facility for auditing of response times and actions taken may be included in the system for subsequent analysis.

In addition to alerting regarding a maintenance event, the alert module 226 may generate driver and route impact reports at regular or predetermined time intervals. These reports may be made available to the appropriate people within the organization for review and action, as discussed below.

Further, the alert module 226 may issue driver alerts. Driver alerts may be sent from the central system 110 to the vehicles 130 to be displayed on an output device (such as a visual alert on a display and/or an audio alert on a speaker) on the vehicle. The alerts may include: (1) on-screen instructions on how to improve driving behavior pointing out specific areas for improvement, such as slower cornering, earlier deceleration, etc.; (2) voice alerts when the driver is doing something that is known to cause lower efficiency (e.g., rapid acceleration); (3) current driving score (e.g., a score indicative of how fuel efficient the driver is driving the vehicle); and (4) cumulative driving score for the past week, month or other time period on which the drivers are evaluated. These alerts are provided merely for illustrative purposes. Other or different alerts may be issued.

The action module 227 may take one or more actions in response to the assess module 225 and/or alert module 226. For example, the action module 227 may schedule work in order to repair the vehicle, may order parts to repair the vehicle, and/or may dispatch workers or alternate vehicles in order to repair the vehicle.

The action module 227 may also assign vehicles to particular routes and/or particular drivers. Specifically, a driver and/or route optimization process may be performed by the action module 227 in order to improve the overall fleet efficiency by creating vehicle-route, vehicle-driver, or vehicle-route-driver match-ups that provide the optimal result. Specifically, the fuel efficiency model may include data regarding the vehicle for a particular route and/or for a particular driver. The action module may access this data in order to assign a particular vehicle to a particular route, assign a particular driver to driver a particular vehicle, and/or assign a particular driver to drive a particular route using a particular vehicle. The driver and/or route optimization process may be in communication with the enterprise scheduling systems to check for availability and automatically assign drivers and vehicles to the appropriate routes. The driver and/or route optimization process may have two main sources of input data: (1) information generated in the assess module 225 on vehicle efficiency as related to route and/or driver (e.g., how a particular vehicle performs on a particular route with a particular driver); and (2) data in the enterprise scheduling system to provide information on available vehicles, available drivers, length of time to complete a route and other necessary inputs. The action module 227 may then run optimization algorithms to determine best possible match-ups of vehicles to drivers to routes, to achieve maximum efficiency.

Alternatively, the fuel efficiency model may include data regarding the vehicle for characteristics of a route (such as fuel efficiency for highway versus city, altitude changes, number and frequency of stops, etc.) and/or for a particular driver. The available routes may also have correlated characteristics (amount of highway versus city driving, number and frequency of stops, etc.). The action module may access the fuel efficiency model and the correlated characteristics for the routes in order to assign a particular vehicle to a particular route, assign a particular driver to driver a particular vehicle, and/or assign a particular driver to drive a particular route using a particular vehicle. The driver and/or route optimization process may be in communication with the enterprise scheduling systems to check for availability and automatically assign drivers and vehicles to the appropriate routes.

The action module 227 may further provide driver incentives. The driver incentive process may encourage drivers to follow the guidelines for efficient driving behavior determined in the assess module 225 by providing incentives for them in form of recognition, monetary rewards and/or other kind. Reports may be generated in the alert module 226, allow management to see a list of best and worst drivers. The ratings may be objective because of the calculations and the baseline established in the assess module 225, thus allowing the management team to provide fair and justified rewards to high performers and encouraging others to improve their driving behavior. Therefore, this approach allows for an objective way to rate driving behavior, unlike previous method to rate driving behavior or determine any reasonable link between equipment failures or efficiency degradation and driving patterns of a given driver.

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. The invention was described with reference to acts and symbolic representations of operations that are performed by one or more electronic devices. As such, it will be understood that such acts and operations include the manipulation by the processing unit of the electronic device of electrical signals representing data in a structured form. This manipulation transforms the data or maintains it at locations in the memory system of the electronic device, which reconfigures or otherwise alters the operation of the electronic device in a manner well understood by those skilled in the art. The data structures where data is maintained are physical locations of the memory that have particular properties defined by the format of the data. While the invention is described in the foregoing context, it is not meant to be limiting, as those of skill in the art will appreciate that the acts and operations described may also be implemented in hardware. Accordingly, it is the intention of the Applicants to protect all variations and modification within the valid scope of the present invention. It is intended that the invention be defined by the following claims, including all equivalents.

The flow charts in FIGS. 3-5 may be encoded in a signal bearing medium, a computer readable medium such as a memory, programmed within a device such as on one or more integrated circuits, or processed by a controller or a computer. If the methods are performed by software, the software may reside in a memory resident to or interfaced to the multi-target system 100, a communication interface, or any other type of non-volatile or volatile memory. The memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. An energy efficiency determination system comprising:
   a receiver that receives operational data about an asset from a sensor indicative of at least one operational characteristic;
   a memory that stores the operational data;
   an asset efficiency model indicative of energy efficiency of the asset;
   a processor in communication with the asset efficiency model and the memory, the processor analyzing real-time energy efficiency of the asset based on the operational data and the asset efficiency model, assessing whether to perform maintenance on the asset based at least on improved efficiency of the asset due to the performed maintenance, and scheduling the maintenance based on the assessing whether to perform the maintenance,
   wherein the asset comprises a vehicle;
   wherein the asset efficiency model comprises data indicative of optimal efficiency of the vehicle,
   further wherein assessing whether to perform maintenance on the asset based at least on improved efficiency of the asset due to the performed maintenance comprises:
      determining a first cost of an increased fuel consumption until a next scheduled vehicle maintenance event;
      determining a second cost of performing maintenance on the asset; and
      comparing the first cost impact with the second cost impact.

2. The energy efficiency determination system of claim 1, wherein analyzing real-time energy efficiency of the asset based on the operational data and the asset efficiency model comprises analyzing fuel efficiency variance.

3. The energy efficiency determination system of claim 2, wherein the asset efficiency model comprises a baseline measure of fuel economy;
   wherein the operational data comprises average fuel economy; and
   wherein analyzing fuel efficiency variance is based on the baseline measure of fuel economy and the average fuel economy.

4. The energy efficiency determination system of claim 1, wherein determining the second cost comprises determining a cost of removing the vehicle from service, a labor cost of performing maintenance on the vehicle outside an existing maintenance schedule, a cost of parts for the maintenance, and a cost of use of a spare vehicle to replace the vehicle that is receiving maintenance.

5. The energy efficiency determination system of claim 1, further comprising an operational model for the vehicle to predict potential failures; and
   wherein the processor predicts failure of the vehicle based on the operational data and the operational model and assesses whether to perform maintenance on the vehicle based on the predicted failure.

6. The energy efficiency determination system of claim 5, wherein assessing whether to perform maintenance on the vehicle based on the predicted failure comprises:

determining an urgency of performing maintenance;
determining a cost allowing the predicted failure to occur;
determining a cost of performing maintenance; and
comparing the cost of allowing the predicted failure to occur versus the cost of performing maintenance.

7. The energy efficiency determination system of claim 6, wherein the processor determines who to alert based on at least one of the urgency of performing maintenance, the cost allowing the predicted failure to occur, or the cost of performing maintenance.

8. A method for determining energy efficiency, the method comprising:
    receiving operational data about an asset from a sensor indicative of at least one operational characteristic;
    storing the operational data;
    analyzing real-time energy efficiency of the asset based on the operational data and an asset efficiency model indicative of energy efficiency of the asset;
    assessing whether to perform maintenance on the asset based at least on improved efficiency of the asset due to the performed maintenance;
    scheduling the maintenance based on the assessing whether to perform the maintenance,
    wherein the asset comprises a vehicle; and wherein the asset efficiency model comprises data indicative of optimal efficiency of the vehicle,
    further wherein assessing whether to perform maintenance on the asset based at least on improved efficiency of the asset due to the performed maintenance comprises:
        determining a first cost of an increased fuel consumption until a next scheduled vehicle maintenance event;
        determining a second cost of performing maintenance on the asset; and
    comparing the first cost impact with the second cost impact.

9. The method of claim 8, wherein analyzing real-time energy efficiency of the asset based on the operational data and the asset efficiency model comprises analyzing fuel efficiency variance.

10. The method of claim 9, wherein the asset efficiency model comprises a baseline measure of fuel economy;
    wherein the operational data comprises average fuel economy; and
    wherein analyzing fuel efficiency variance is based on the baseline measure of fuel economy and the average fuel economy.

11. The method of claim 8, wherein determining the second cost comprises
    determining a cost of removing the vehicle from service, a labor cost of performing maintenance on the vehicle outside an existing maintenance schedule, a cost of parts for the maintenance, and
    a cost of use of a spare vehicle to replace the vehicle that is receiving maintenance.

12. The method of claim 8, further comprising:
    accessing an operational model for the vehicle to predict potential failures;
    predicting failure of the vehicle based on the operational data and the operational model; and
    assessing whether to perform maintenance on the vehicle based on the predicted failure.

13. The method of claim 12, wherein assessing whether to perform maintenance on the vehicle based on the predicted failure comprises determining an urgency of performing maintenance, determining a cost allowing the predicted failure to occur, determining a cost of performing maintenance, and comparing the cost of allowing the predicted failure to occur versus the cost of performing maintenance.

14. The method of claim 13, further comprising determining who to alert based on at least one of the urgency of performing maintenance, the cost allowing the predicted failure to occur, or the cost of performing maintenance.

* * * * *